(12) United States Patent
Lee

(10) Patent No.: US 10,890,100 B2
(45) Date of Patent: Jan. 12, 2021

(54) INTEGRATED FLOW CONTROL VALVE AND ENGINE SYSTEM INCLUDING THE SAME

(71) Applicants: HYUNDAI MOTOR COMPANY, Seoul (KR); KIA MOTORS CORPORATION, Seoul (KR)

(72) Inventor: Hyo-Jo Lee, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/430,141

(22) Filed: Jun. 3, 2019

(65) Prior Publication Data

US 2020/0131977 A1 Apr. 30, 2020

(30) Foreign Application Priority Data

Oct. 26, 2018 (KR) .................. 10-2018-0129255

(51) Int. Cl.
| | |
|---|---|
| *F16K 3/18* | (2006.01) |
| *F16K 1/44* | (2006.01) |
| *F16K 31/52* | (2006.01) |
| *F01P 7/14* | (2006.01) |
| *F16K 31/524* | (2006.01) |
| *F28F 27/02* | (2006.01) |

(52) U.S. Cl.
CPC .............. *F01P 7/14* (2013.01); *F16K 1/44* (2013.01); *F16K 31/52416* (2013.01); *F01P 2007/146* (2013.01); *F28F 27/02* (2013.01)

(58) Field of Classification Search
CPC ......... F16K 1/44; F16K 3/186; F16K 31/52416
USPC .......... 137/624.22, 630.2; 251/203, 251, 259
See application file for complete search history.

(56) References Cited

FOREIGN PATENT DOCUMENTS

| KR | 101694043 B1 | 1/2017 |
|---|---|---|
| KR | 101876094 B1 | 7/2018 |

OTHER PUBLICATIONS

Original and Translation of WO 0046535 A1; Piat Moise; Aug. 10, 2000.*

* cited by examiner

*Primary Examiner* — Paul J Gray
(74) *Attorney, Agent, or Firm* — McDonnell Boehnen Hulbert & Berghoff LLP

(57) ABSTRACT

The integrated flow control valve according to the present disclosure is a cam-lift type integrated flow control valve, and an additional valve is integrally formed with at least one of a plurality of valves, this additional valve is configured to be moved upward and downward in response to vertical movement of the corresponding valve to open and close an additional outlet except for a plurality of outlets which are opened and closed by the plurality of valves. In an engine system according to the present disclosure, a flow of coolant flowing into a heater, an oil cooler, a radiator and an exhaust gas heat exchanger in the engine system is integratedly controlled through control of the above described integrated control valve, so that it is possible to effectively control a flow rate of coolant as well as a temperature of coolant.

9 Claims, 12 Drawing Sheets

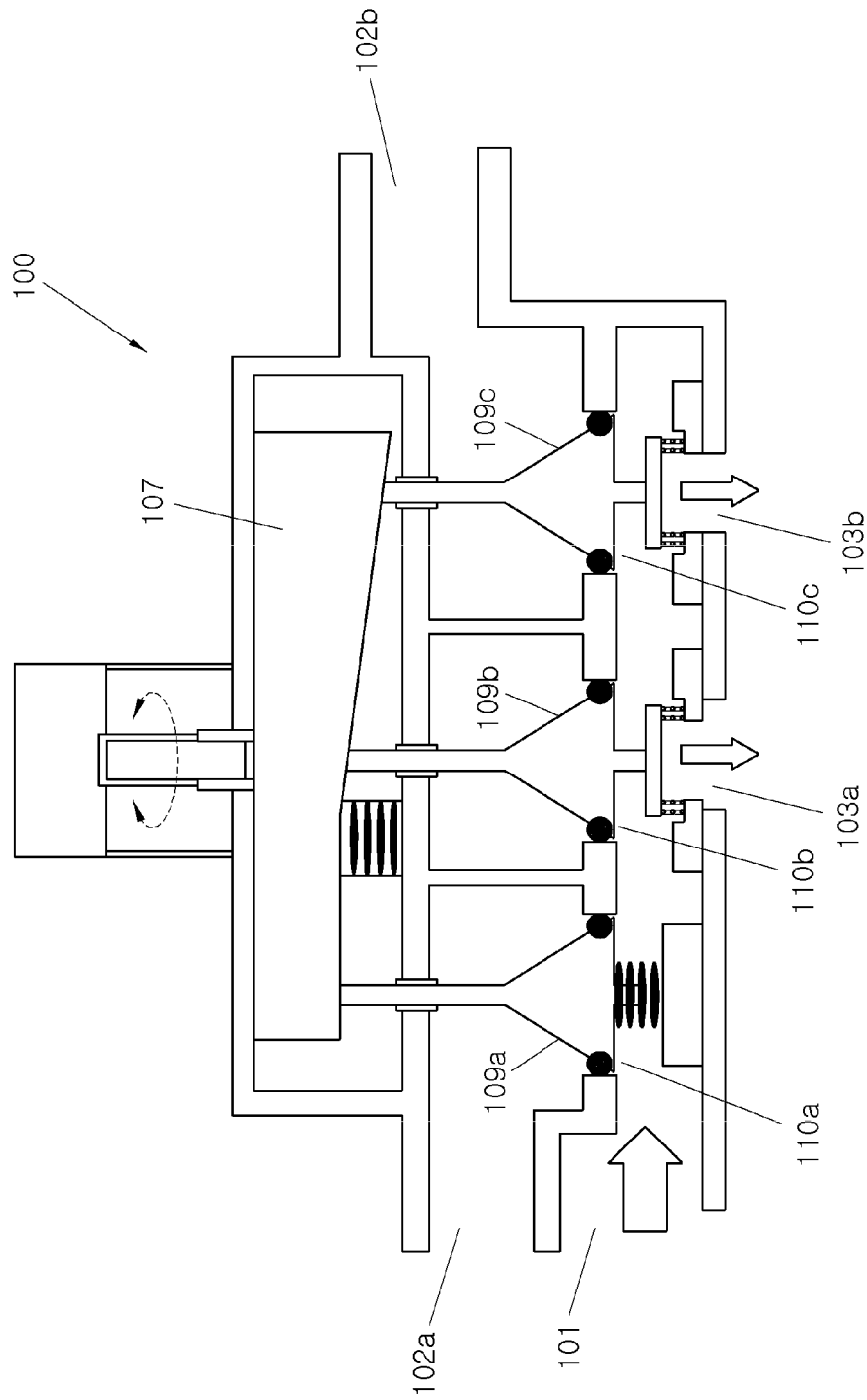

INTEGRATED FLOW CONTROL VALVE AND ENGINE SYSTEM INCLUDING THE SAME

CROSS REFERENCE TO RELATED APPLICATION

This application claims priority to Korean Patent Application No. 10-2018-0129255, filed on Oct. 26, 2018, which is incorporated herein by reference in its entirety.

BACKGROUND

Field of the Disclosure

The present disclosure relates to an integrated flow control valve capable of separately controlling a flow rate of coolant passing through an engine, a radiator, a heater, and an oil cooler, and effectively controlling a temperature of coolant, and to an engine system including the integrated flow control valve.

Description of Related Art

An engine generates rotational force using combustion of fuel, and discharges the remaining energy as heat energy. In particular, coolant is circulated in the engine, a heater and a radiator to absorb the heat energy and discharge the absorbed heat energy to the outside.

Meanwhile, when a temperature of coolant of the engine is low, viscosity of oil is increased to increase frictional force, fuel consumption tends to be increased, a temperature of exhaust gas is slowly increased to extend a time for activation of a catalyst, and quality of exhaust gas may be deteriorated. In addition, time for normalization of functions of the heater is extended, so that passengers and a driver may feel cold.

On the other hand, if a temperature of coolant of the engine is excessively high, knocking occurs, and ignition timing needs to be adjusted for suppression of the occurrence of knocking, thereby causing performance deterioration. Further, if a temperature of lubricant oil is excessively high, lubrication performance may be deteriorated.

Therefore, a single integrated flow control valve controlling several cooling elements using one valve is employed to maintain a temperature of coolant at a specific portion of the engine to be high and a temperature of coolant at other portions to be low.

The integrated flow control valve is divided into a rotary valve type flow control valve as disclosed in Korean Patent No. 10-1694043 and a cam-lift type (poppet valve type) flow control valve disclosed in Korean Patent No. 10-1876094. FIG. 6 illustrates a conventional cam lift type integrated flow control valve 100. The cam lift type integrated flow control valve is configured to be moved in response to a rotation of a cam 107 about a shaft 108, so that a valve 109 opens and closes a flow passage according to vertical movement of a pivot arm portion.

The rotary type integrated flow control valve has advantages in that a configuration thereof is simple and a flow rate may be controlled by varying a shape of the flow passage of the rotary valve, but may cause problems such as poor controllability, coolant leakage on the valve and the like. On the other hand, in the cam lift type integrated flow control valve, a flow control valve is moved upward and downward by rotation of a cam to control flow. This cam lift type integrated flow control valve has good controllability as compared with the rotary type integrated flow control valve, but may cause problems such as valve wear, tilting and leakage of coolant resulting from repetitive operation.

FIG. 7 illustrates an engine system to which a conventional integrated flow control valve 100 is applied. The engine system illustrated in FIG. 7 is provided with an engine consisting of a cylinder head 510 and a cylinder block 520, a coolant storage tank 300, a water pump 400, an oil cooler 700, a heater 600, a radiator 800, an exhaust gas recirculation (EGR) cooler 900 and the integrated flow control valve 100, and the integrated flow control valve 100 selectively circulates coolant passing through the engine to the heater 600, the oil cooler 700 and the radiator 800 through each supply line.

As described above, the engine system to which the conventional integrated flow control valve 100 is applied controls only a flow rate of coolant flowing to the heater 600, the oil cooler 700 and the radiator 800. In order to maximize fuel efficiency and performance of the engine, however, it is necessary to appropriately control not only a flow rate of coolant but also a temperature of coolant which is being circulated.

The contents described in Description of Related Art are to help the understanding of the background of the present disclosure, and may include what is not previously known to those skilled in the art to which the present disclosure pertains.

SUMMARY

The present disclosure is devised to solve the above problems of the prior art, the object of the present disclosure is to provide an integrated flow control valve capable of effectively controlling a flow rate of coolant flowing into each of components constituting an engine system as well as a temperature of coolant, and an engine system to which the integrated flow control valve is applied.

In order to achieve the above object, an integrated flow control valve according to the present disclosure may include a valve housing having an inlet into which fluid flows and a plurality of outlets from which fluid is discharged, a cam part provided in the valve housing and configured to be rotated by receiving rotational force generated by a driving means, a plurality of pivot arm portions disposed below the cam part, each of the plurality of pivot arm portions being configured to allow one end portion of thereof to be moved in a vertical direction by rotation of the cam part, and valves provided at the one end portions of the plurality of pivot arm portions, respectively, the valves being configured to be moved together according to movement of the pivot arm portions, wherein the plurality of outlets are selectively opened and closed, respectively, according to vertical movements of each of the plurality of valves caused by rotation of the cam part, and wherein an additional valve is integrally formed with at least one of the plurality of valves, and the additional valve is configured to be moved upward and downward in response to vertical movement of the corresponding valve to open and close an additional outlet except for the plurality of the outlets which are opened and closed by the plurality of valves.

Preferably, the pivot arm portion may extend downward from a lower end of at least one of the plurality of valves, and the additional valve may be provided at one end portion of the extended pivot arm portion.

Preferably, the valve housing may be provided with an inflow chamber formed therein and configured to allow fluid to flow thereinto through the inlet, and the plurality of outlets may be arranged to penetrate one side of the inflow chamber, and the additional outlet may be arranged to penetrate the other side of the inflow chamber, whereby as the valve, on which the additional valve is formed, of the plurality of valves is moved downward by rotation of the cam part, the additional outlet is closed by the additional valve while any one of the plurality of outlets is opened.

Preferably, a valve spring holder portion may be provided above the additional outlet, and an additional valve return spring may be provided in a state where both end portions in a vertical direction are in contact with the additional valve and the valve spring holder portion, respectively.

In order to achieve the above object, an engine system according to the present disclosure may include an engine for driving a vehicle; the above described integrated flow control valve being configured to selectively circulate coolant, which has passed through the engine and is supplied through the inlet, into at least one of an oil cooler and a heater through the plurality of outlets; an exhaust gas heat exchanger configured to heat-exchange exhaust gas generated by combustion of fuel in the engine with coolant discharged from the additional outlet of the integrated flow control valve, and to supply coolant, which has been heat-exchanged with exhaust gas, to the oil cooler or the heater; and a controller configured to control rotation of the cam part for controlling an open and close state of the integrated flow control valve, wherein the additional valve of the integrated flow control valve opens and closes the additional outlet through which coolant is discharged to the exhaust gas heat exchanger.

Preferably, the integrated flow control valve may further include an outlet through which coolant flowed thereinto is discharged to at least one of an exhaust gas recirculation (EGR) cooler and a radiator, and the outlets may be opened and closed by the plurality of valves to control a circulation of coolant into at least one of the EGR cooler and the radiator.

Preferably, when coolant is in a cold state in which a temperature of coolant is below a first temperature, the controller may control the integrated flow control valve so that all of the valves of the integrated flow control valve including the additional valve are closed to halt discharge of coolant which has flowed into the integrated flow control valve.

Preferably, the additional valve may be integrally formed with the valve that opens and closes an outlet through which coolant is discharged to the heater, and the controller may control the integrated flow control valve so that, when coolant is in a warm state in which a temperature of coolant exceeds the first temperature, and the heater is in an operation state, the additional outlet is opened while the outlet through which coolant is discharged to the heater is closed.

Preferably, the additional valve may be integrally formed with the valve that opens and closes an outlet through which coolant is discharged to the oil cooler, and the controller may control the integrated flow control valve so that, when coolant is in a warm state in which a temperature of coolant exceeds the first temperature, and a temperature of oil passing through the oil cooler is below a predetermined temperature, the additional outlet is opened while the outlet through which coolant is discharged to the oil cooler is closed.

Preferably, the controller may control the integrated flow control valve so that, when coolant is in a hot state in which a temperature of coolant exceeds a second temperature, all of a plurality of valves except for the additional valve are in an opened state.

It is preferable that a valve housing of the integrated flow control valve and the exhaust gas heat exchanger may be integrally formed with each other.

Preferably, a separate preheating device may be provided in a coolant flow passage in a valve housing of the integrated flow control valve.

BRIEF DESCRIPTION OF THE FIGURES

FIGS. 3A, 3B, and 3C are explanatory views showing an operation state of the integrated flow control valve in accordance with an embodiment of the present disclosure.

DETAILED DESCRIPTION

Hereinafter, the preferred embodiments of the present disclosure will be described with reference to the accompanying drawings.

Figure 1:
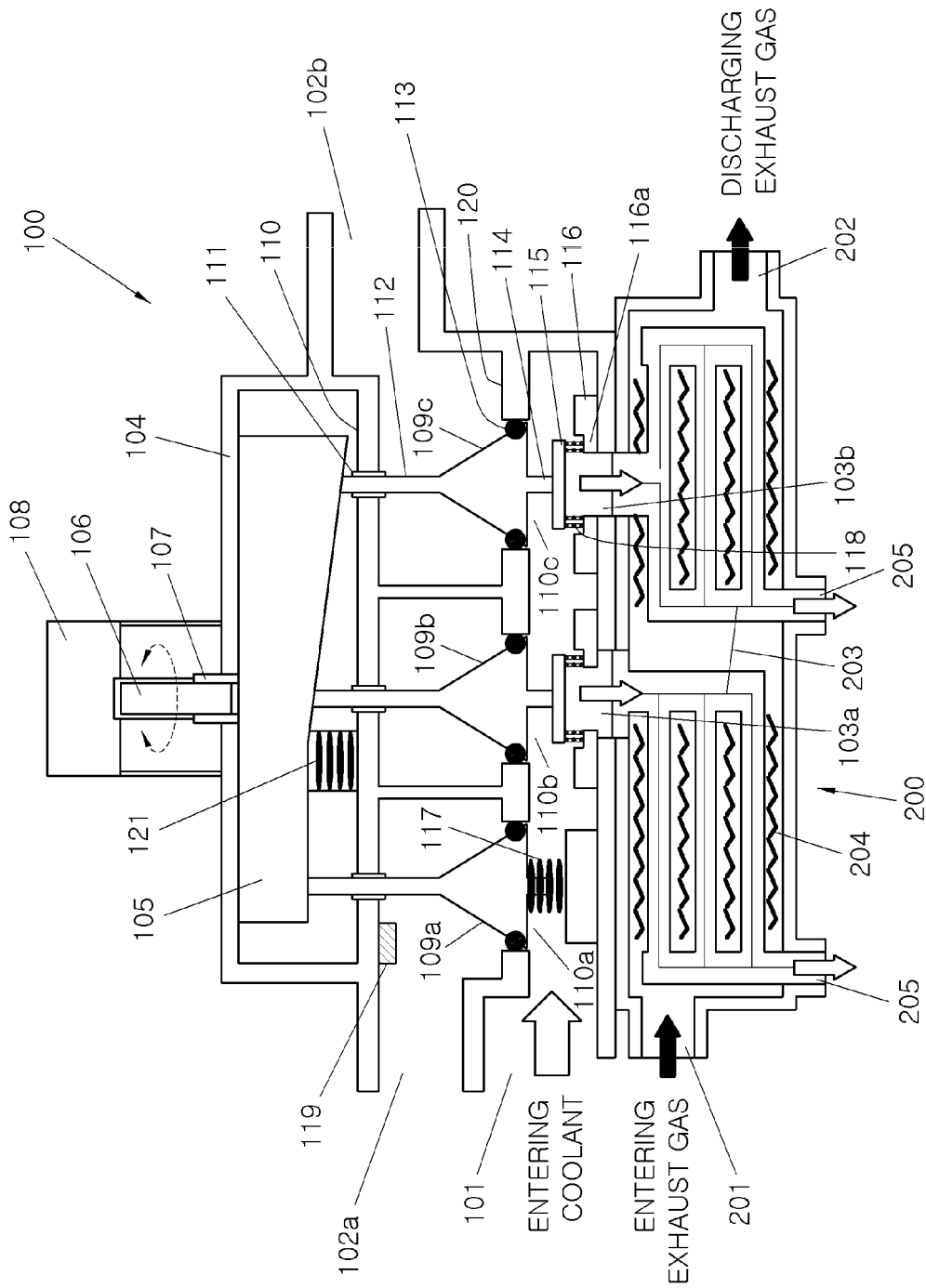
FIG. 1 is a cross-sectional view of an integrated flow control valve in accordance with an embodiment of the present disclosure.

FIG. 1 is a cross-sectional view of an integrated flow control valve in accordance with an embodiment of the present disclosure.

Referring to FIG. 1, an integrated flow control valve 100 includes a cam part 105, a plurality of pivot arm portions 112, a plurality of valves 109a, 109b, 109c and a valve housing 104. Although three valves 109 are shown, it should be understood that more or less valves could be used.

Figure 5:
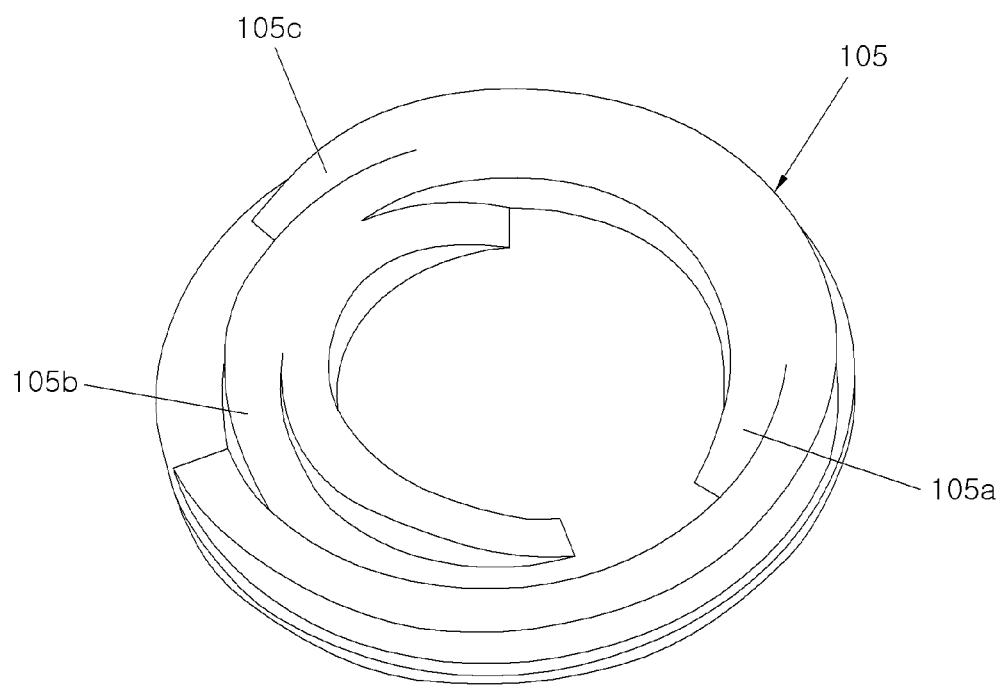
FIG. 5 is a perspective view illustrating a cam part of the integrated flow control valve in accordance with an embodiment of the present disclosure.
Figure 6:
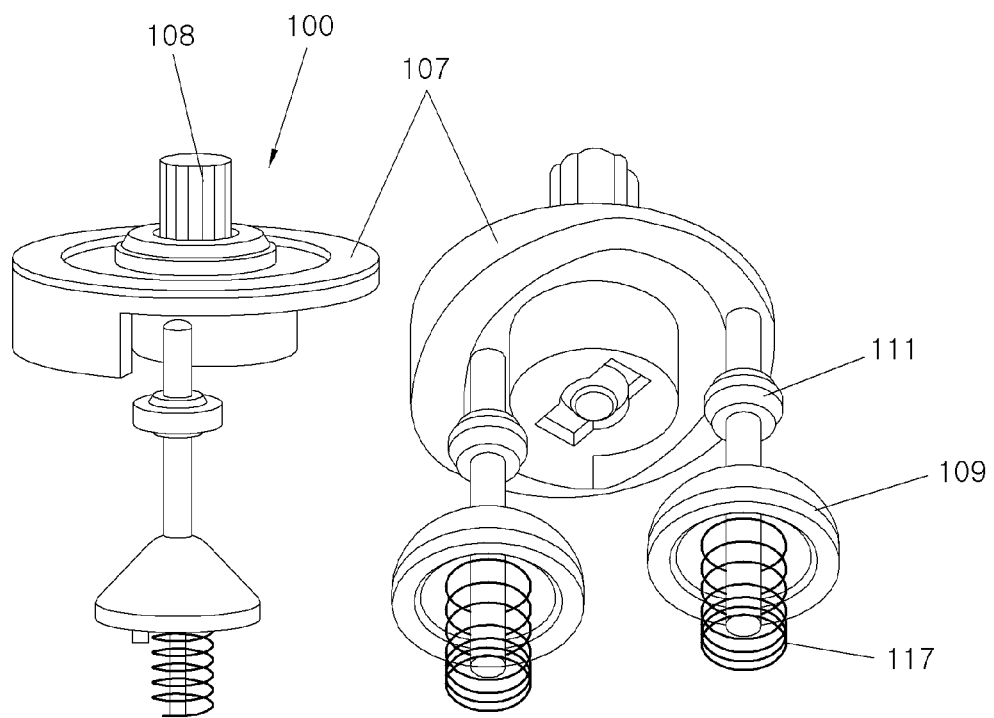
FIG. 6 is a partial configuration view of a conventional cam-lift type integrated flow control valve.
Figure 7:
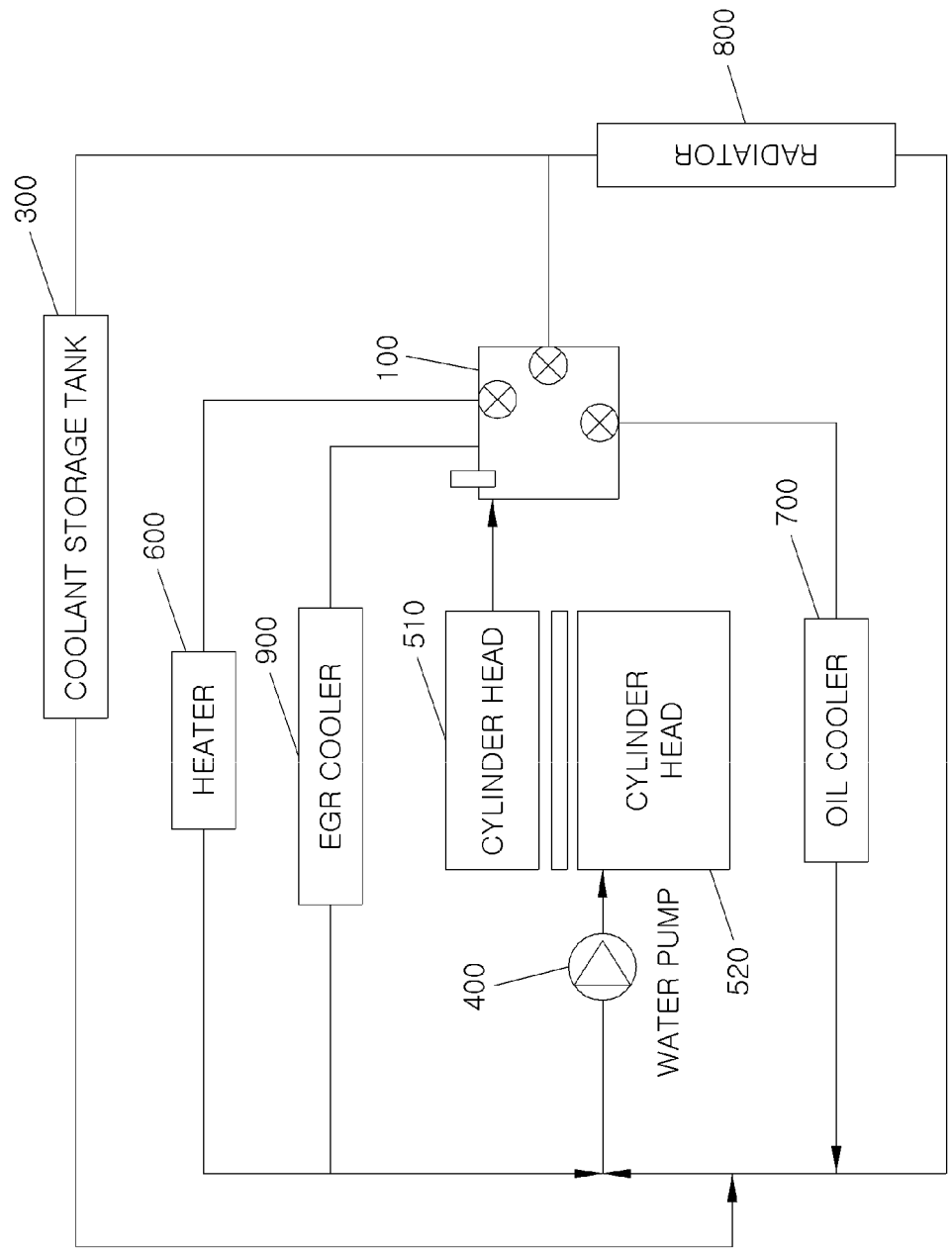
FIG. 7 is an entire configuration view of an engine system including the conventional integrated flow control valve shown in FIG. 6.

First, one end of a shaft 106 extending upward from a center of the cam part 105 is connected to a driving unit such as a motor 108, so that the cam part 105 receives a driving force from the driving unit to be rotated. In addition, the pivot arm portions 112 are operated according to a rotation of the cam part 105 to drive the valves 109a, 109b, 109c. To this end, as illustrated in FIG. 5, slopes 105a, 105b, and 105 are provided below the cam part 105. The number of slopes corresponds to the number of pivot arm portions 112. Inclined surfaces of the above slopes 105a, 105b, 105c press upper ends of the pivot arm portions 112 according to a rotation of the cam part 105 to make the pivot arm portions 112 to be lowered. Although three slopes 105 are shown, it should be understood that more or less slopes may be present.

The plurality of pivot arm portions 112 are disposed below the cam part 105 according to flow passages of coolant discharged from the integrated flow control valve 100, and as described below, are configured to be rotated together with the cam part in response to a rotation of the cam part 105 to be moved in a vertical direction.

The valve housing 104 is a space for accommodating components of the integrated flow control valve 100, and includes an inlet 101 into which fluid (coolant) flows from the engine and a plurality of outlets 102a, 102b through which fluid is discharged. Although two outlets 102 are shown, it should be understood that more or less outlets may be present. A through hole through which the shaft 106 of the cam part 105 passes is formed in an upper portion of the valve housing 104, and a bearing 107 that rotatably supports the shaft 106 is provided in the through hole.

A space, in which the cam part 105 is provided, in the valve housing 104 and a space formed below the above space is partitioned by a plate 110. On an upper surface of the plate 110, a compression spring 121 for pressing and supporting the cam part 105 upward is provided. In addition, the plate 110 is provided with mounting holes for guiding mounting positions of the plurality of pivot arm portions 112, respectively, and each of the mounting holes is provided with a bearing 111 for slidably supporting the pivot arm portion 112.

A fixing portion 120 in which flow passages 110a, 110b, 110c are formed is formed below the plate 110, and the flow passages are opened and closed by the valves 109a, 109b, 109c. The flow passages 110a, 110b, 110c are passages for allowing fluid entered through the inlet 101 to flow into an internal space of the integrated flow control valve 100, and are opened/closed by the corresponding valves 109a, 109b, 109c.

In addition, in a lower side of the fixing portion 120, additional outlets 103a, 103b are formed to allow fluid entered the inlet 101 to flow into an exhaust gas heat exchanger 200 which is described in detail below.

By partition walls extending between the plate 110 and the fixing portion 120, the internal space of the valve housing 104 between the plate 110 and the fixing portion 120 is partitioned into same number of spaces as the number of poppet valves therein. Each of the spaces is sealed by the partition wall so that fluid in the spaces cannot communicate with each other. In addition, each of the plurality of outlets 102a, 102b is provided in the partitioned internal space and is configured to communicate with the oil cooler 700, the heater 600, the radiator 800, the EGR cooler 900, etc. of the engine system. Thus, fluid flowed into the partitioned internal space through each of the flow passages 110a, 110b, 110c flows to the oil cooler 700, the heater 600, the radiator 800, the EGR cooler 900, and the like of the engine system through each of the outlets 102a, 102b.

The valves 109a, 109b, 109c are provided at the lower end portions of the pivot arm portions 112, respectively, and are moved in the vertical direction according to vertical movements of the pivot arm portions 112 to open and close the corresponding flow passages 110a, 110b, 110c. In order to enhance hermeticity when the flow passages are closed by the valves 109a, 109b, 109c, a groove is formed on an outer circumferential surface of a lower end portion of each of the valves 109a, 109b, 109c in a circumferential direction and an O-ring 113 is provided in the groove.

Below the first valve 109a of the plurality of valves, a valve spring 117 is provided for pressing the first valve 109a upward. One end of the valve spring 117 is connected to a lower end surface of the first valve 109a, and the other end of the valve spring 117 is mounted in a valve spring holder 116 placed on an upper surface of the fixing portion 120. By pressing force of the valve spring 117, the pivot arm portions 112 can be moved in accordance with the shapes of the slopes 105a, 105b and 105c of the cam part 105 when the cam part 105 is rotated.

Unlike the first valve 109a, each of the second valve 109b and the third valve 109c are provided with a second pivot arm portion 114 extending downward from a lower surface of each respective valve. In addition, an additional valve 115 is provided at a lower end of each of the second pivot arm portions 114. The additional valves 115 are moved in a vertical direction in accordance with vertical movements of the second valve 109b and the third valve 109c to open and close the additional outlets 103a and 103b formed in the fixing portion 120.

Like the first valve 109a, an additional valve return spring 118 is provided on a lower surface of each of the additional valves 115, and a lower end of the additional valve return spring 118 is supported by the valve spring holder 116. The spring holders 116 corresponding to the second valve 109b and the third valve 109c, respectively, are disposed at positions of the fixing portion 120, which correspond to the additional outlets 103a and 103b, respectively and each of the spring holders has a hollow shape in which a portion corresponding to the additional outlet 103a or 103b is pierced. Further, the spring holder 116 has a protrusion 116a extending inwardly from an inner circumferential surface of a hollow portion thereof, and the lower end of the additional valve return spring 118 is seated on an upper surface of this protrusion 116a. As illustrated in FIG. 1, the protrusion 116a and the spring holder 116 have a stepped shape when viewed from the side.

Thus, when the second valve 109b and the third valve 109c are moved downward, the additional valves 115 provided in the valves, respectively, are moved downward according to the movement of the valves, and accordingly, the additional valves 115 may close the opened hollow portions of the valve spring holder 116 to close the additional outlets 103a, 103b. On the contrary, when the second valve 109b and the third valve 109c are moved upward, the additional valves 115 provided in the valves, respectively, are moved upward according to the movement of the valves, and accordingly, the additional valves 115 may be spaced apart from the opened hollow portions of the valve spring holder 116 to open the additional outlets 103a, 103b.

Therefore, according to the above-described configuration, as described below with reference to FIG. 3, it is possible to control opening and closing of two additional outlets as well as two outlets together by using two valves. Therefore, it is possible to simultaneously control opening and closing of four flow passage by using two valves.

As illustrated FIG. 1, the exhaust gas heat exchanger 200 is disposed below the integrated flow control valve 100. The exhaust gas heat exchanger 200 is provided with an exhaust gas inlet 201 into which exhaust gas discharged from the engine flows. In addition, the exhaust gas heat exchanger 200 is provided with a coolant flow passage 203 and a heat exchange fin 204 installed therein so that exhaust gas flowed into the exhaust gas heat exchanger and coolant discharged from the additional outlets 103a, 103b of the integrated flow control valve 100 may exchange heat energy with each other. Coolant that has been heat-exchanged with exhaust gas is discharged to the heater 600 and/or the oil cooler 700 through a discharge port 205, and exhaust gas that has been heat-exchanged with coolant is discharged to an exhaust system of a vehicle through an exhaust gas discharge port 202.

In the embodiment illustrated in FIG. 1, the integrated flow control valve 100 and the exhaust gas heat exchanger 200 are integrally formed with each other. In this case, a size of the entire apparatus can be reduced, which is advantageous for a layout design of the engine system. However, the present disclosure is not limited to this embodiment, and the integrated flow control valve 100 and the exhaust gas heat exchanger 200 may be separately formed to communicate with each other by a predetermined flow passage.

In addition, it is preferable that, as illustrated in FIG. 1, a separate heater 119 (glow, plug) capable of preheating coolant may be provided in the valve housing 104 of the integrated flow control valve 100. This also enables a temperature of coolant supplied through the integrated flow control valve 100 to be increased.

Figure 3B:
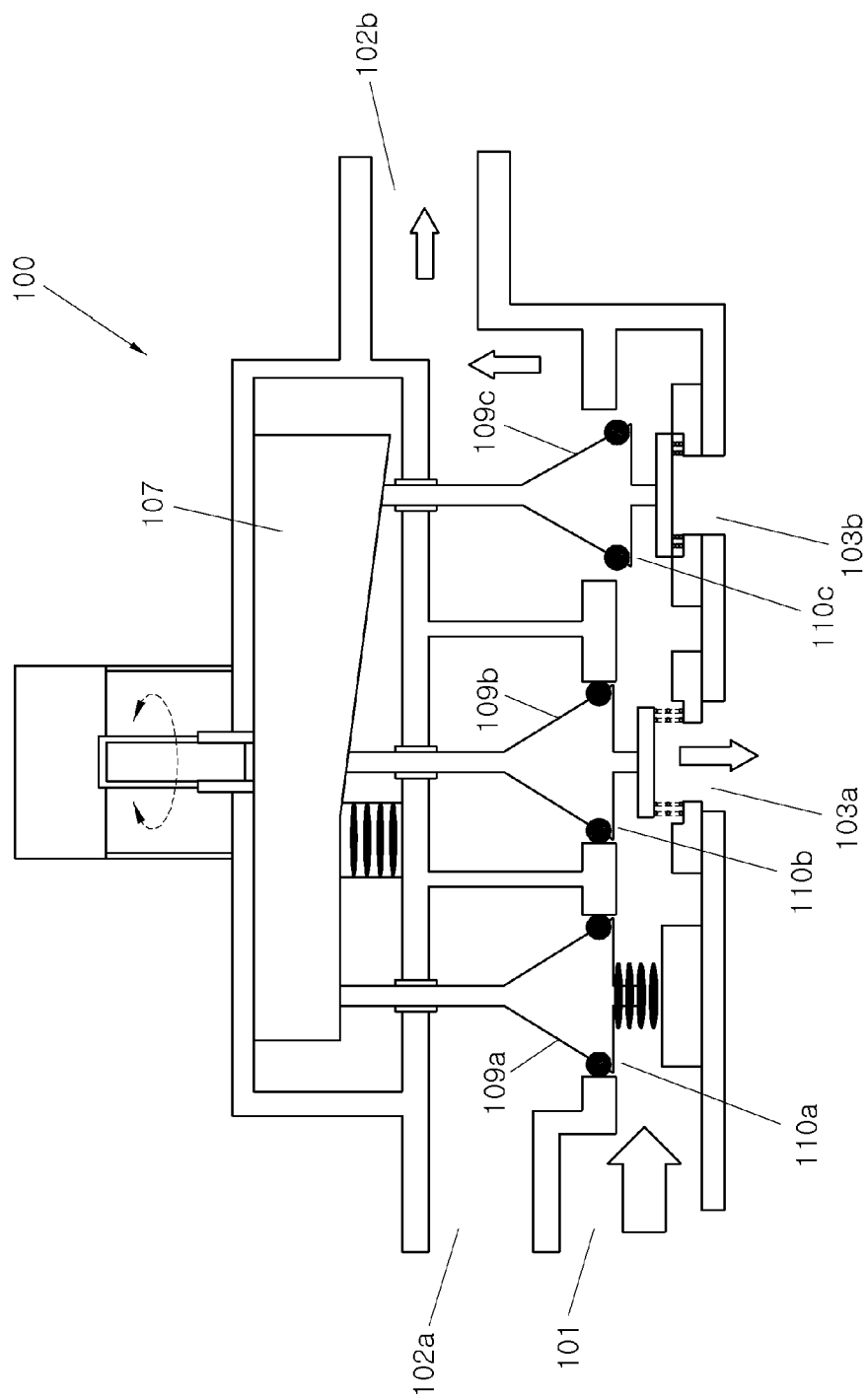
Figure 3C:
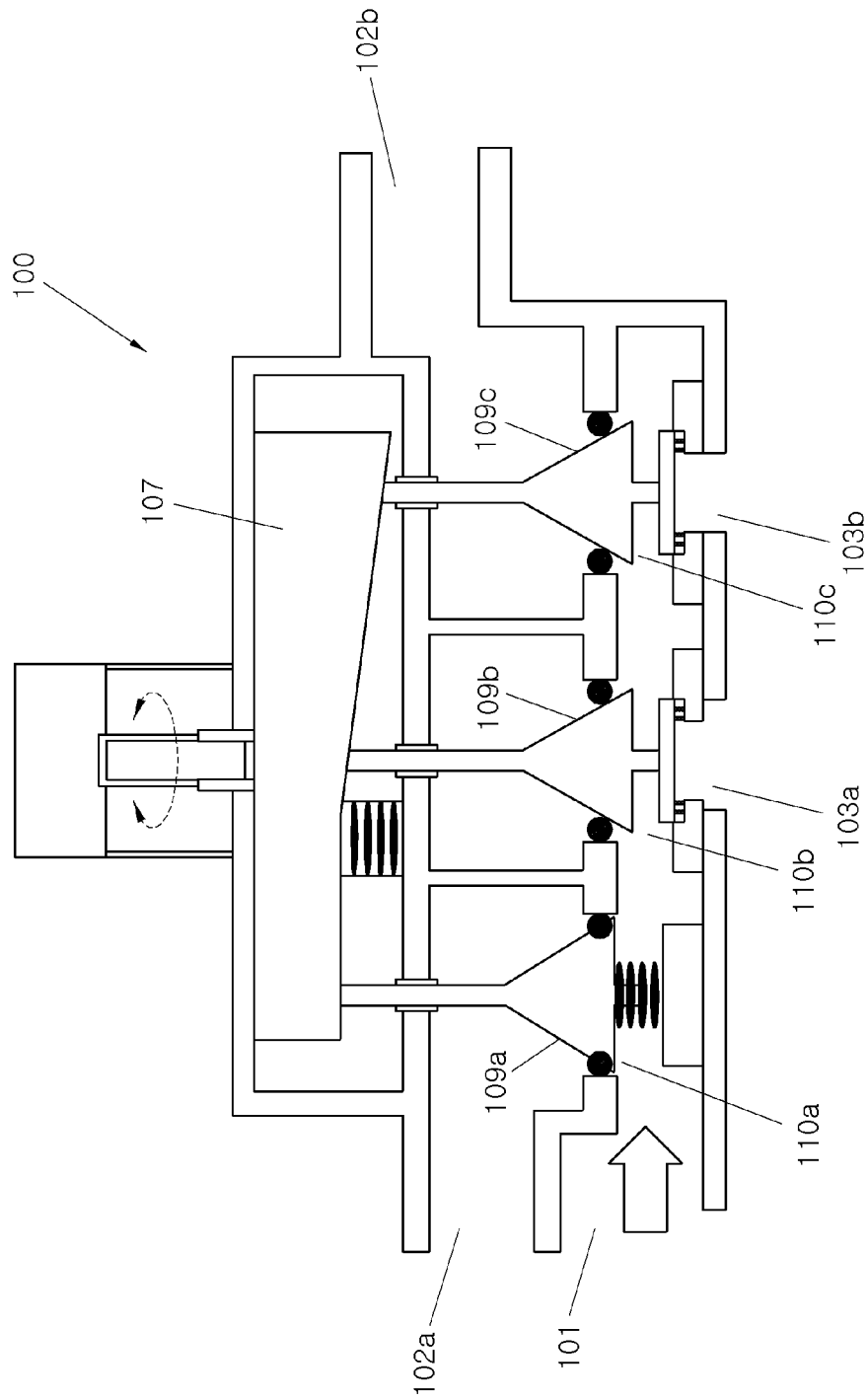

FIGS. 3A to 3C are explanatory views showing an operation state of the integrated flow control valve in accordance with the embodiment of the present disclosure.

FIG. 3A shows a state in which the first flow passage 110a, the second flow passage 110b and the third flow passage 110c are in a closed state while two additional outlets 103a and 103b are opened.

In the state shown FIG. 3A, one end of each of the three pivot arm portions 112 are moved upward as the cam part 105 is rotated. As a result, the first valve 109a, the second valve 109b and the third valve 109c provided in the pivot arm portions 112, respectively, are moved upward to close the first flow passage 110a, the second flow passage 110b and the third flow passage 110c. On the other hand, as the second valve 109b and the third valve 109c are moved upward, the additional valves 115 are also moved upward, as a result, the additional outlets 103a, 103b are opened.

FIG. 3B shows a state in which the first flow passage 110a, the second flow passage 110b and the additional outlet 103b are closed, and the third flow passage 110c and the additional outlet 103a are opened.

In the state of FIG. 3B, as the cam part 105 is rotated, one end of the two pivot arm portions of the three pivot arm portions 112 are moved upward and the one pivot arm portion is moved downward. As a result, the first valve 109a and the second valve 109b provided in the two pivot arm portions 112, respectively, which are moved upward to close the first flow passage 110a and the second flow passage 110b, and the third valve 109c provided in the one pivot arm portion 112 which is moved downward is moved downward to open the third flow passage 110c.

In addition, as the second valve 109b is moved upward, the additional valve 115 is also moved upward, as a result, the additional outlet 103a is opened. Furthermore, as the third valve 109c is moved downward, the additional valve 115 is also moved downward, as a result, the additional outlet 103b is closed.

FIG. 3C shows a state in which all of the first flow passage 110a, the second flow passage 110b, the third flow passage 110c, and the two additional outlets 103a, 103b are closed.

In the state of FIG. 3C, although one end of each of the three pivot arm portions 112 are moved upward as the cam part 105 is rotated, all of the pivot arm portions 112 do not reach a top dead center. In this state, the additional valve 115 is spaced apart from the protrusion 116a of the valve spring holder 116, but is not completely separated from the valve spring holder 116. Thus, as a result, the additional outlets 103a, 103b are also kept closed by the additional valves 115.

As described above, according to the integrated flow control valve of the present disclosure, it is possible to control opening and closing of the five flow passages by controlling the upward and downward movement of the three valves. Therefore, the number of components of the integrated flow control valve can be reduced to simplify the valve structure. Further, it is possible to reduce size and weight of the integrated flow control valve and to save cost of the components of the integrated flow control valve.

Figure 2:
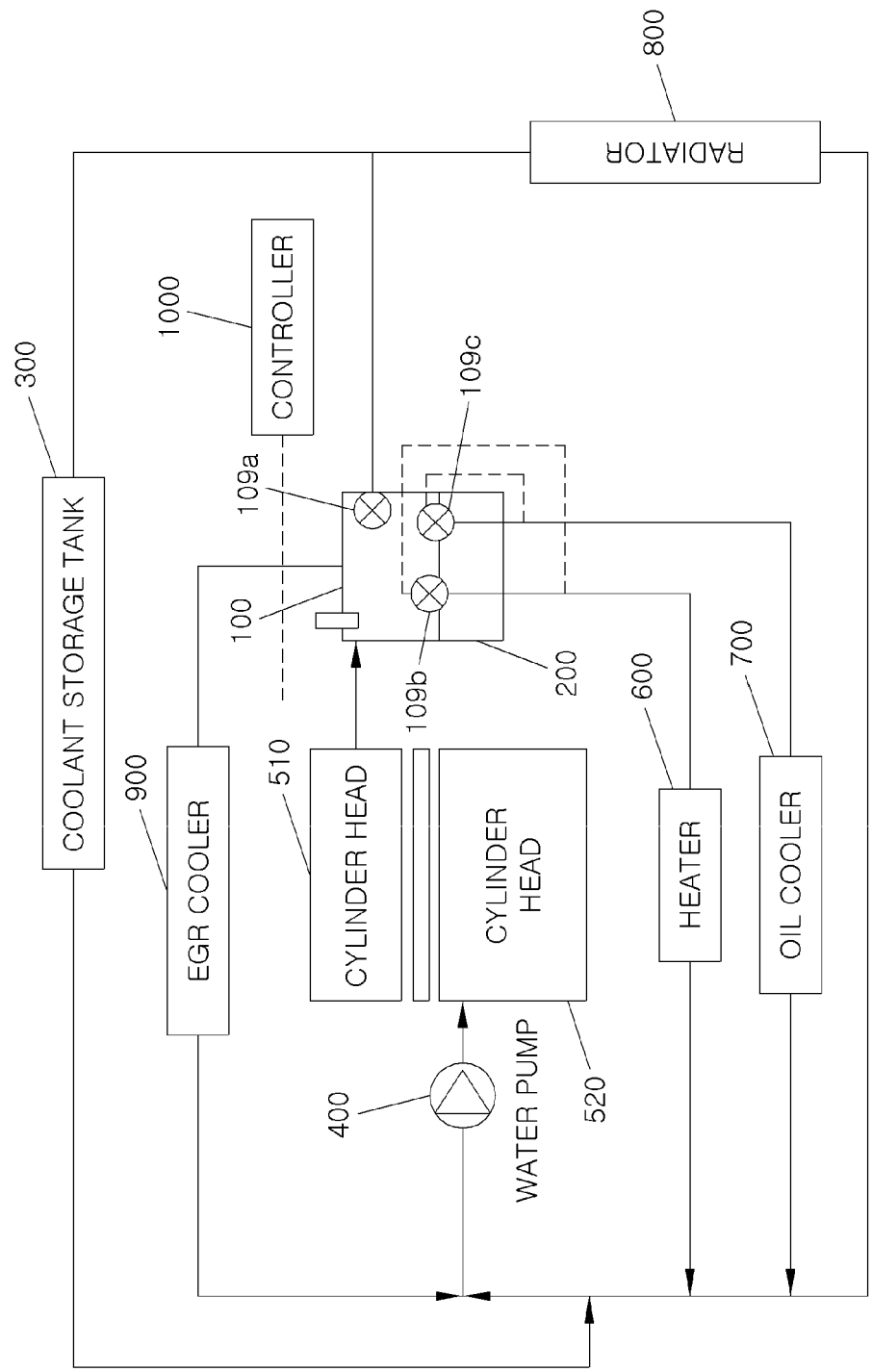
FIG. 2 is a partial configuration view of an engine system including the integrated flow control valve in accordance with an embodiment of the present disclosure.

FIG. 2 is a partial configuration view of an engine system including the integrated flow control valve in accordance with the embodiment of the present disclosure.

As illustrated in FIG. 2, the engine system including the integrated flow control valve according to the embodiment of the present disclosure is provided with an engine consisting of a cylinder head 510 and a cylinder block 520, the exhaust gas heat exchanger 200, the integrated flow control valve 100 illustrated in FIG. 1 and controlled to be opened or closed by a controller 1000, an oil cooler 700, a heater 600, a radiator 800, an exhaust gas recirculation (EGR) cooler 900.

Coolant is pumped by a water pump 400 and flows into the cylinder block 520 and the cylinder head 510 of the engine to cool the engine. Coolant that has cooled the engine is supplied to the integrated flow control valve 100 through the inlet 101.

Coolant supplied to the integrated flow control valve 100 is selectively supplied to the oil cooler 700, the heater 600 and the radiator 800 according to driving condition of the engine and a temperature of coolant. Meanwhile, although FIG. 2 illustrates the example in which coolant is always supplied to the EGR cooler 900, the present disclosure is not limited to the above embodiment. By adjusting the number of the valves provided in the integrated flow control valve 100, it is possible to selectively supply coolant to the EGR cooler 900 through the integrated flow control valve 100 in the same manner as the oil cooler 700, the heater 600 and the radiator 800.

The oil cooler 700 functions to cool oil or to heat oil using supplied coolant, and the heater 600 functions to heat indoor air of a vehicle using supplied coolant. In addition, the radiator 800 functions to radiate heat of high-temperature coolant to the outside.

As illustrated in FIG. 1, the exhaust gas heat exchanger 200 functions to exchange heat energies of coolant discharged from the additional outlets 103a, 103b of the integrated flow control valve 100 to the heater 600 and oil cooler 700 and of exhaust gas discharged from the engine with each other.

In the example illustrated in FIGS. 1 and 2, the first valve 109a of the integrated flow control valve 100 controls a flow rate of coolant supplied to the radiator 800, the second valve 109b and the additional valve 115 provided in the second valve 109b control a flow rate of coolant supplied to the heater 600 and the exhaust gas heat exchanger 200, respectively, and the third valve 109c and the additional valve 115 provided in the third valve 109c control a flow rate of coolant supplied to the oil cooler 700 and the exhaust gas heat exchanger 200, respectively. In addition, coolant that has passed through the exhaust gas heat exchanger 200 is supplied to the heater 600 and the oil cooler 700, respectively.

FIGS. 4A to 4D are views showing a flow of coolant according to an operating condition of the engine in the engine system including the integrated flow control valve in accordance with the embodiment of the present disclosure. In the drawings, portions indicated by a thick line indicate the portions in which coolant flows.

Figure 4A:
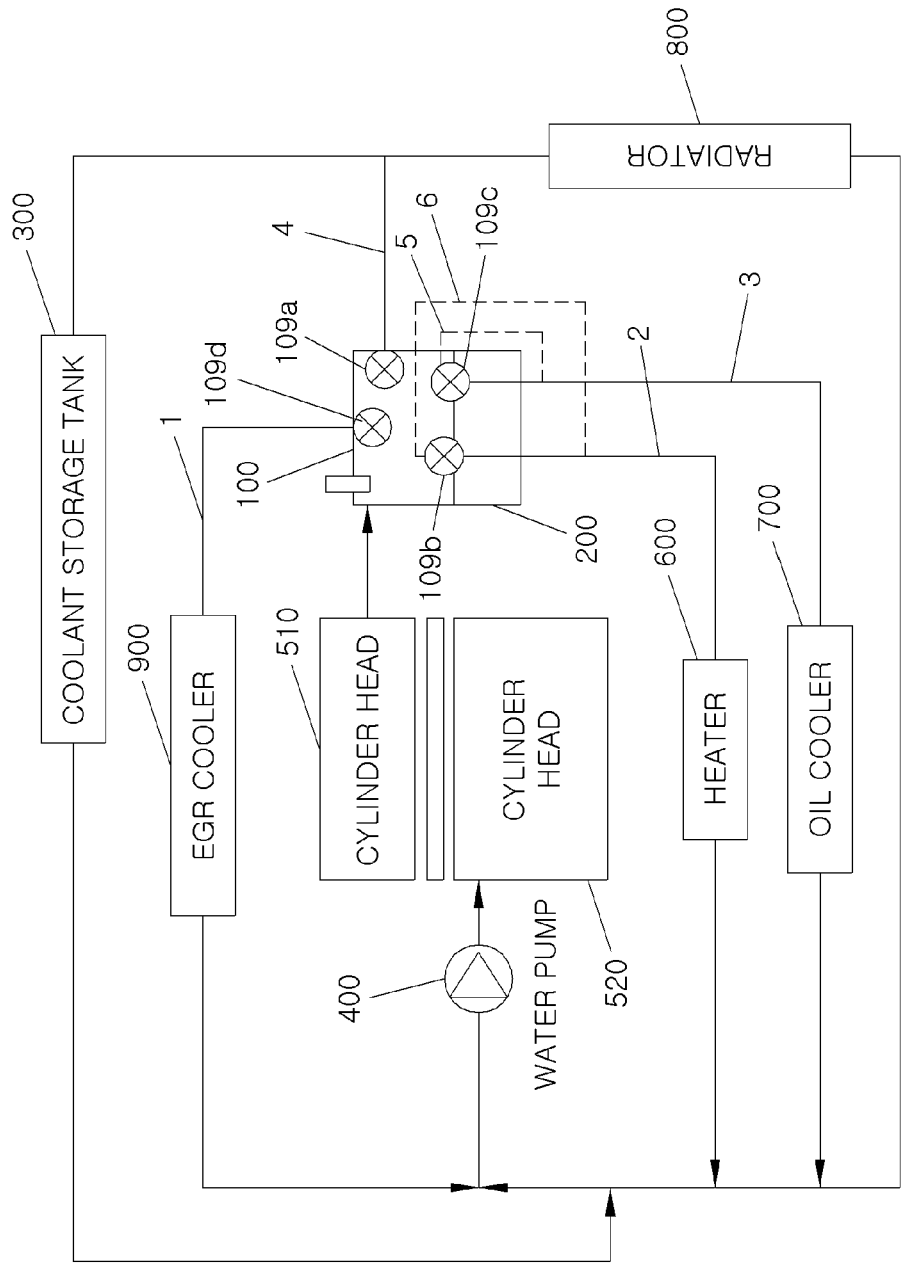
FIGS. 4A, 4B, 4C, and 4D are views showing a coolant flow according to an engine operation condition in the engine system including the integrated flow control valve in accordance with an embodiment of the present disclosure.

FIG. 4A is a view showing a flow of coolant when the operation condition of the engine is in cold condition. When the engine is in the cold state (for example, approximately less than 50° C.), for a rapid warm-up, there is a need to halt a flow of coolant so as to increase a temperature of coolant as quickly as possible.

Accordingly, the controller 1000 controls the integrated flow control valve 100 so that all of the first, second and third valves 109*a*, 109*b* and 109*c* and the additional valves 115 are in the closed state as in the example illustrated in FIG. 3C.

Figure 4B:
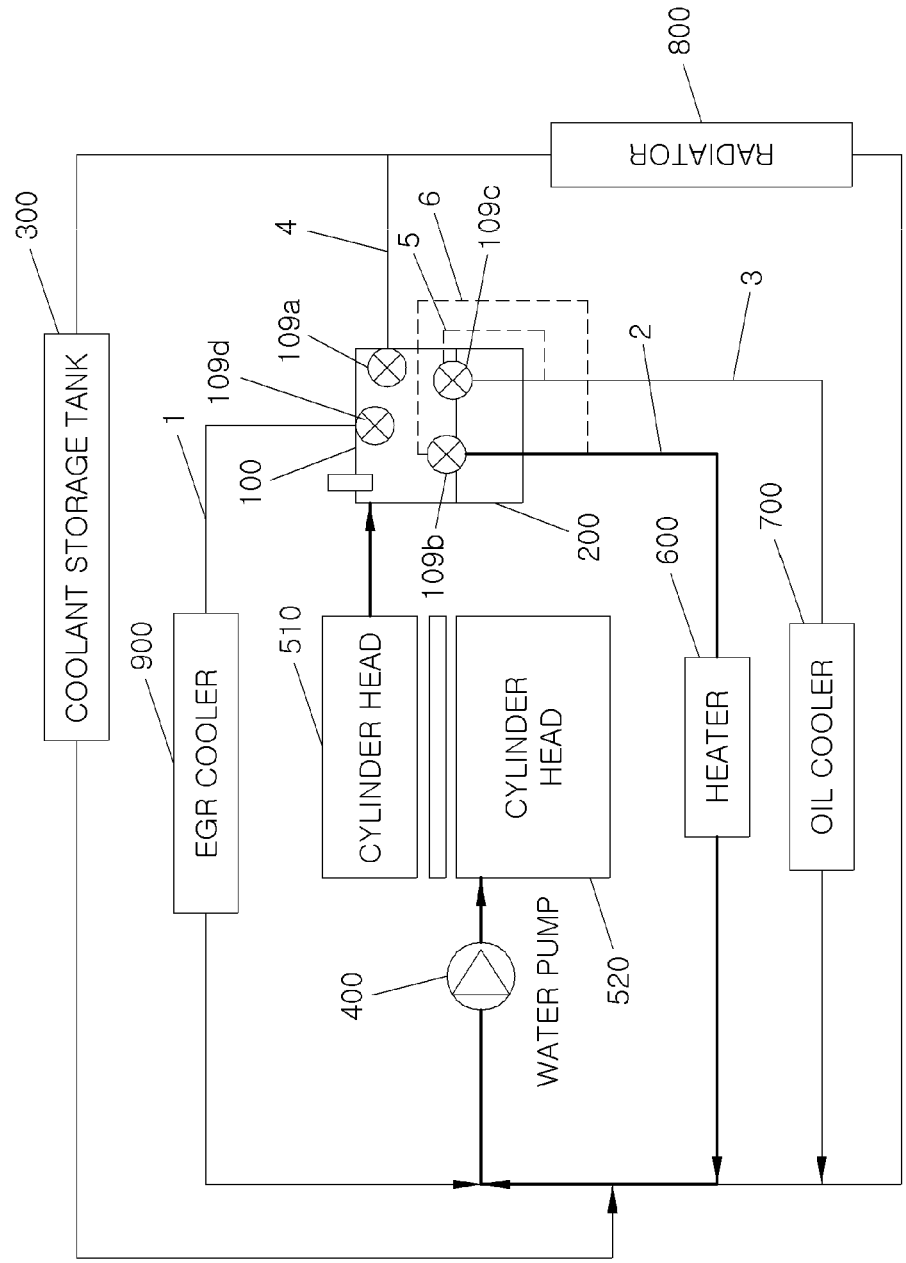

FIG. 4B is a view showing an example of a flow of coolant when the operation condition of the engine is changed from the cold condition to warm condition. When the engine is in the warm state where a temperature of coolant is higher than that in FIG. 4A, the heater 600 is in an operable state. In this case, in order to improve heating performance and fuel efficiency, it is preferable to supply coolant to the heater 600 in a state where a temperature of coolant has been raised.

To this end, in the engine system according to the present disclosure, the controller 1000 controls the integrated flow control valve 100 so that the second valve 109*b* which controls a flow rate of coolant flowing into the heater 600 is in the closed state and the additional valve 115, which follows movement of the second valve 109*b* and controls a flow rate of coolant flowing into the exhaust gas heat exchanger 200, is in an opened state (see FIG. 3B).

In this case, a flow passage 2 through which coolant is supplied from the integrated flow control valve 100 to the heater 600 via the exhaust gas heat exchanger 200 is in the opened state, but a flow passage 5 through which coolant is directly supplied from the integrated flow control valve 100 to the heater 600 is in a closed state. Accordingly, only coolant, which has passed through the exhaust gas heat exchanger 200 and been heated, is supplied to the heater 600 to enable heating performance to be enhanced and fuel efficiency to be improved.

Figure 4C:
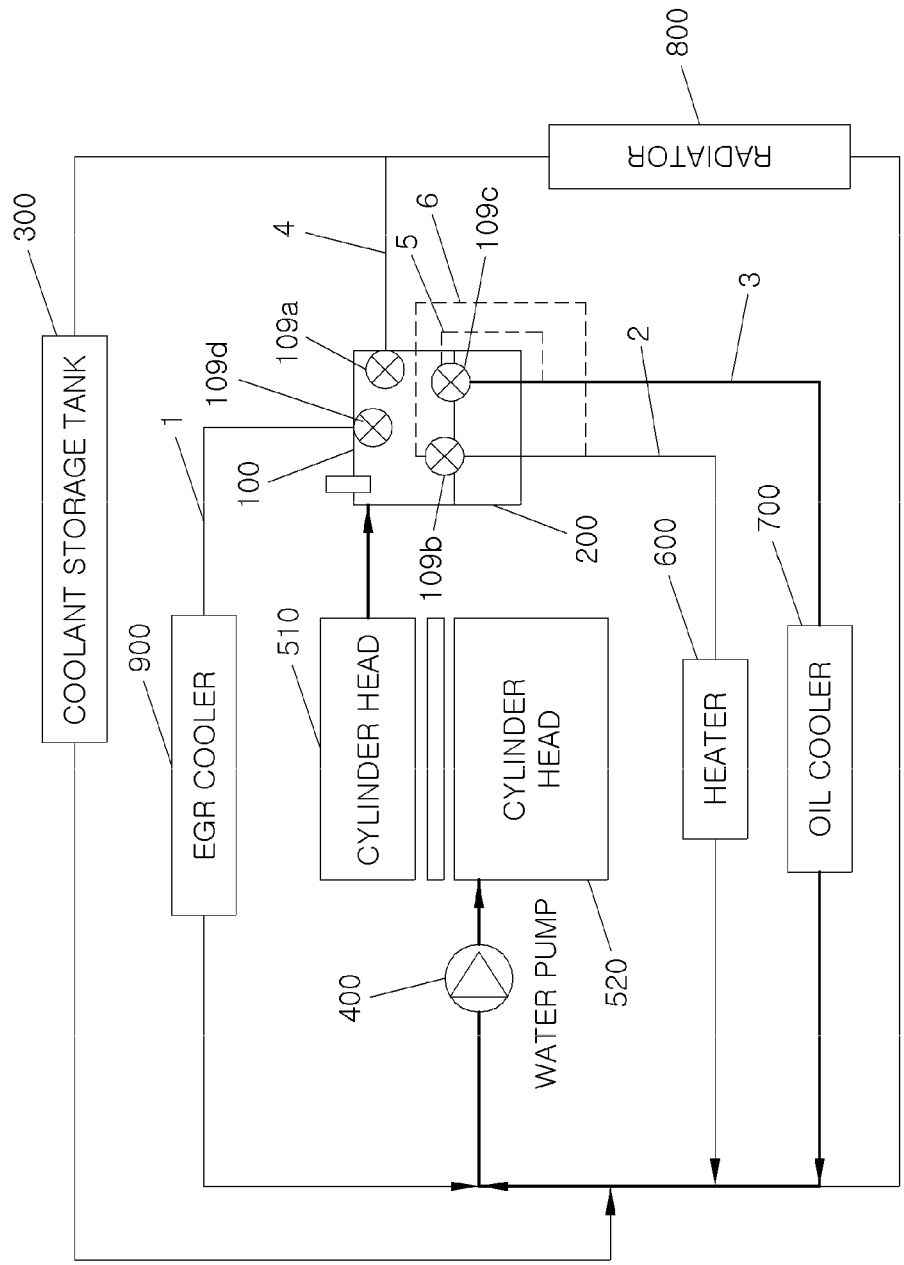

FIG. 4C is a view showing a flow of coolant in another preferred embodiment when the operation condition of the engine is changed from the cold condition to the warm condition. When the engine is in the warm state in which a temperature of coolant is higher than that in FIG. 4A, a temperature of oil is relatively low. In this case, in order to reduce a friction inside the engine and to improve fuel efficiency and engine performance, it is preferable to increase a temperature of coolant and then to supply coolant to the oil cooler 700.

To this end, in the engine system according to the present disclosure, the controller 1000 controls the integrated flow control valve 100 so that the third valve 109*c* which controls a flow rate of coolant flowing into the oil cooler 700 is in the closed state and the additional valve 115, which follows movement of the third valve 109*c* and controls a flow rate of coolant flowing into the exhaust gas heat exchanger 200, is in an opened state (see FIG. 3B).

In this case, a flow passage 3 through which coolant is supplied from the integrated flow control valve 100 to the oil cooler 700 via the exhaust gas heat exchanger 200 is in the opened state, but a flow passage 6 through which coolant is directly supplied from the integrated flow control valve 100 to the oil cooler 700 is in a closed state. Accordingly, only coolant, which has passed through the exhaust gas heat exchanger 200 and been heated, is supplied to the oil cooler 700 to enable a friction inside the engine to be reduced, and fuel efficiency and performance to be improved.

Figure 4D:
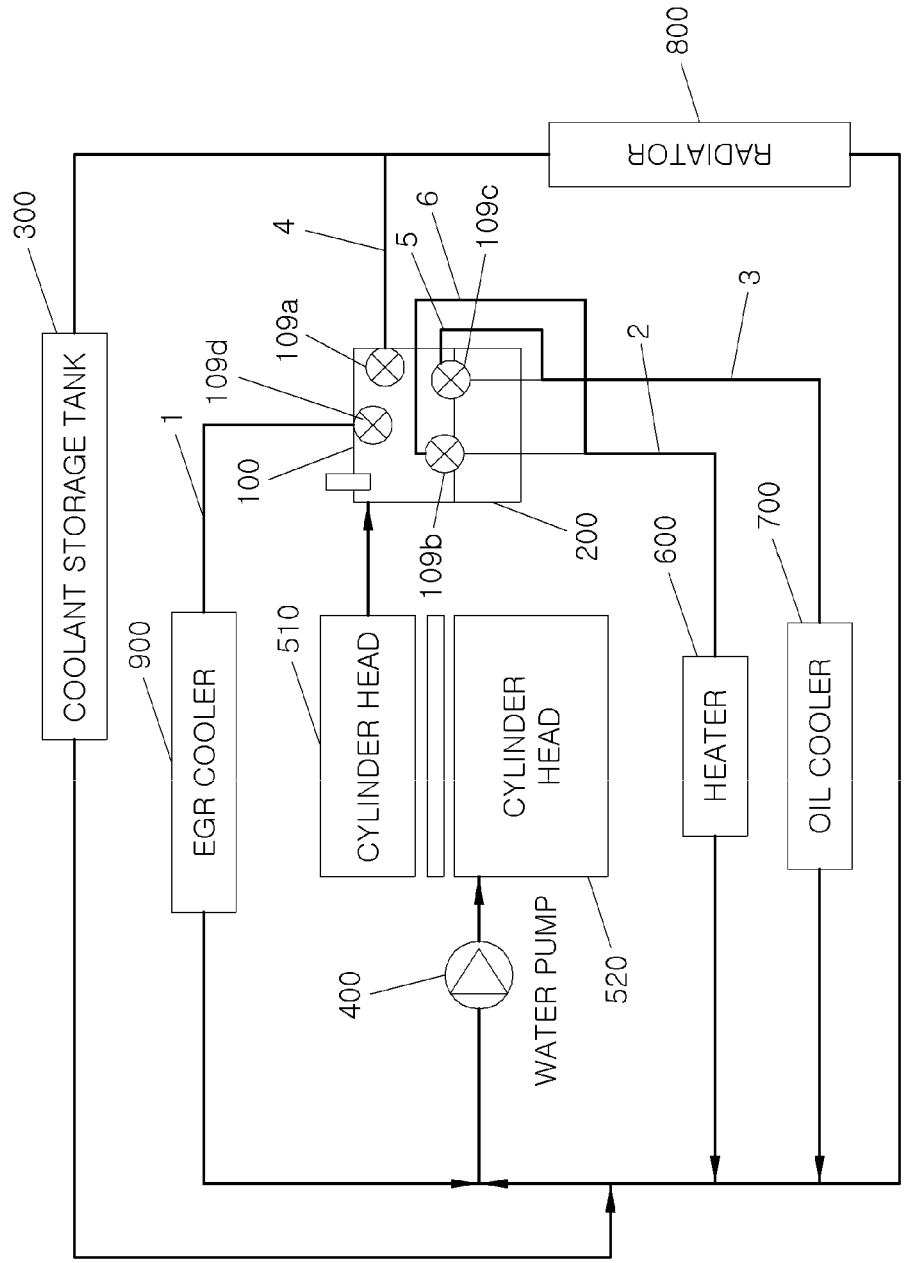

FIG. 4D is a view showing a flow of coolant in another preferred embodiment when the operation condition of the engine is changed from the warm condition to a high-temperature hot condition. In the case where the engine is in the hot state, in order not to cause a problem in cooling the engine, it is necessary to control a flow rate of coolant to the maximum and there is a need to prevent coolant from being overheated. That is, coolant should be controlled to pass through the radiator 800, and is need to be controlled not to pass through the exhaust gas heat exchanger 200.

To this end, in the engine system according to the present disclosure, the controller 1000 controls the integrated flow control valve 100 so that all of the first valve 109*a* controlling a flow rate of coolant flowing into the radiator 800, the second valve 109*b* controlling a flow rate of coolant flowing into the heater 600 and the third valve 109*c* controlling a flow rate of coolant flowing into the oil cooler 700 are in the opened state and the additional valves 115 following the second valve 109*b* and the third valve 109*c*, respectively, are in the closed state. To this end, the integrated flow control valve 100 is controlled such that an upper end of the pivot arm portion 112 of each of the first valve 109*a*, the second valve 109*b* and the third valve 109*c* is lowered to a point which is below an upper end of the pivot arm portion of each valve in the embodiment illustrated in FIG. 3C.

In this case, the flow passages 4, 5, 6 through which coolant is supplied from the integrated flow control valve 100 to the radiator 800, the heater 600 and the oil cooler 700 are in the opened state, but the flow passage 2 through which coolant is supplied to the heater 600 via the exhaust gas heat exchanger 200 and the flow passage 3 through which coolant is supplied to the oil cooler 700 via the exhaust gas heat exchanger 200 are in the closed state.

Therefore, coolant that has passed through the radiator 800 is supplied to the engine without passing through the exhaust gas heat exchanger 200, so that it is possible to effectively suppress the overheating of the engine.

As described above, in the engine system including the integrated flow control valve 100 according to the present disclosure, by integratedly controlling flows of coolant flowing into the heater 600, the oil cooler 700, the radiator 800 and the exhaust gas heat exchanger 200 in the engine system by employing the one integrated flow control valve 100, it is possible to effectively control a flow rate of coolant as well as a temperature of coolant. Therefore, since heat generation of the engine can be integratedly managed through the engine system including the integrated flow control valve 100 according to the present disclosure, it is possible to maximize fuel efficiency, improve heating performance, and reduce a friction in the engine.

Since the integrated flow control valve according to the present disclosure can control a temperature of coolant using exhaust heat of exhaust gas, as well as a flow rate of coolant, it is possible to prevent the entire engine from being overheated and cooled and to integratedly manage heat generation in the engine, thereby maximizing fuel efficiency.

Also, according to the present disclosure, since it is possible to increase a temperature of coolant which is supplied to the oil cooler through the integrated flow control valve, a temperature of oil can be appropriately controlled, thereby reducing a friction and improving fuel efficiency.

In addition, according to the present disclosure, a temperature of coolant supplied to the heater can be increased through the integrated flow control valve, so that it is possible to improve heating performance of the heater.

Further, according to the present disclosure, since the two flow passages can be simultaneously controlled by one valve provided in the integrated flow control valve, the number of components of the integrated flow control valve can be reduced, and a configuration of the valve can be simplified. Further, it is possible to reduce size and weight of the integrated flow control valve and to reduce cost of the component.

While the present disclosure has been described with reference to the embodiment(s) thereof illustrated in the drawings, it is only illustrative. It will be understood by those skilled in the art that various modifications may be made from the embodiments and that all or part of the above described embodiment(s) may be selectively combined to configure the modifications. Accordingly, the true scope of the present disclosure should be determined by the technical spirit defined in the appended claims.

The invention claimed is:

1. An integrated flow control valve comprising:
a valve housing having an inlet into which fluid flows and a plurality of first outlets from which fluid is discharged;
a cam part provided in the valve housing and configured to be rotated by receiving rotational force generated by a driving means;
a plurality of pivot arm portions disposed below the cam part, each of the plurality of pivot arm portions being configured to allow one end portion to be moved in a vertical direction by rotation of the cam part; and
a plurality of first valves provided at the one end portion of each of the plurality of pivot arm portions, respectively, the first valves being configured to be moved together according to movement of the pivot arm portions,
wherein the plurality of first outlets are selectively opened and closed, respectively, according to vertical movements of each of the plurality of first valves caused by rotation of the cam part,
wherein a second valve is integrally formed with at least one of the plurality of first valves, and the second valve is configured to be moved upward and downward in response to vertical movement of the corresponding first valve to open and close a second outlet,
wherein the pivot arm portion comprises an extended pivot arm portion which extends downward from a lower end of at least one of the plurality of first valves, and the second valve is provided at a lower end portion of the extended pivot arm portion,
wherein the valve housing is provided with an inflow chamber formed therein and configured to allow fluid to flow thereinto through the inlet,
wherein the plurality of first outlets are arranged on a first side of the inflow chamber to enable outflow of fluid from the inflow chamber, and the second outlets are arranged on a second side of the inflow chamber to enable outflow of fluid from the inflow chamber,
wherein the plurality of first valves are provided to control outflow of fluid through the plurality of respective first outlets and at least one second valve, which is formed attached to the lower end portion of the extended pivot arm portion of the respective first valve, is provided to control outflow of fluid through the plurality of respective second outlets,
wherein movement of the plurality of first valves away from the first side of the inflow chamber towards the second side of the inflow chamber opens the plurality of respective first outlets and causes the at least one second valve to close at least one corresponding second outlet, and
wherein a valve spring holder portion is provided above the second outlet, and a valve return spring is provided in a state where both end portions in a vertical direction are in contact with the second valve and the valve spring holder portion, respectively.

2. An engine system comprising;
an engine for driving a vehicle;
an integrated flow control valve formed according to claim 1, the integrated flow control valve being configured to selectively circulate coolant, which has passed through the engine and is supplied through the inlet, into at least one of an oil cooler and a heater through the plurality of first outlets;
an exhaust gas heat exchanger configured to heat-exchange exhaust gas generated by combustion of fuel in the engine with coolant discharged from the second outlet of the integrated flow control valve, and to supply coolant, which has been heat-exchanged with exhaust gas, to the oil cooler or the heater; and
a controller configured to control rotation of the cam part for controlling an open and close state of the integrated flow control valve,
wherein the second valve of the integrated flow control valve opens and closes the second outlet through which coolant is discharged to the exhaust gas heat exchanger.

3. The engine system of claim 2, wherein the integrated flow control valve further comprises an outlet through which coolant flowed thereinto is discharged to at least one of an exhaust gas recirculation (EGR) cooler and a radiator, and the outlet is opened and closed by the plurality of first valves to control a circulation of coolant into at least one of the EGR cooler and the radiator.

4. The engine system of claim 2, wherein when coolant is in a cold state in which a temperature of coolant is below a first temperature, the controller controls the integrated flow control valve so that all of the valves of the integrated flow control valve including the second valve are closed to halt discharge of coolant which has flowed into the integrated flow control valve.

5. The engine system of claim 2, wherein the second valve is integrally formed with the first valve that opens and closes an outlet through which coolant is discharged to the heater, and the controller controls the integrated flow control valve so that, when coolant is in a warm state in which a temperature of coolant exceeds the first temperature, and the heater is in an operation state, the second outlet is opened while the outlet through which coolant is discharged to the heater is closed.

6. The engine system of claim 2, wherein the second valve is integrally formed with the first valve that opens and closes an outlet through which coolant is discharged to the oil cooler, and the controller controls the integrated flow control valve so that, when coolant is in a warm state in which a temperature of coolant exceeds the first temperature, and a temperature of oil passing through the oil cooler is below a predetermined temperature, the second outlet is opened while the outlet through which coolant is discharged to the oil cooler is closed.

7. The engine system of claim 2, wherein the controller controls the integrated flow control valve so that, when coolant is in a hot state in which a temperature of coolant exceeds a second temperature, all of the plurality of first valves are in an opened state.

8. The engine system of claim 2, wherein a valve housing of the integrated flow control valve and the exhaust gas heat exchanger are integrally formed with each other.

9. The engine system of claim 2, wherein a separate preheating device is provided on a coolant flow passage in a valve housing of the integrated flow control valve.

* * * * *